United States Patent
Shimizu et al.

(10) Patent No.: US 7,945,114 B2
(45) Date of Patent: May 17, 2011

(54) IMAGE TRANSFORM METHOD FOR OBTAINING EXPANDED IMAGE DATA, IMAGE PROCESSING APPARATUS AND IMAGE DISPLAY DEVICE THEREFORE

(75) Inventors: Junya Shimizu, Yokohama (JP); Kazuo Sekiya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/132,611

(22) Filed: Jun. 4, 2008

(65) Prior Publication Data

US 2008/0285889 A1 Nov. 20, 2008

Related U.S. Application Data

(63) Continuation of application No. 09/879,529, filed on Jun. 12, 2001, now Pat. No. 7,397,972.

(30) Foreign Application Priority Data

Jun. 13, 2000 (JP) ................................. 2000-177640

(51) Int. Cl.
*G06K 9/40* (2006.01)
(52) U.S. Cl. ....................................... 382/274; 348/678
(58) Field of Classification Search .................. 382/274; 348/603, 678; 345/617
See application file for complete search history.

(56) References Cited

U.S. PATENT DOCUMENTS

| | | | | |
|---|---|---|---|---|
| 5,294,989 A * | 3/1994 | Moore et al. | .................. | 348/241 |
| 5,532,948 A * | 7/1996 | Kohno et al. | .................. | 708/207 |
| 5,875,268 A * | 2/1999 | Miyake | .......................... | 382/276 |
| 6,331,862 B1 * | 12/2001 | Yamada et al. | ................ | 345/660 |
| 6,636,629 B1 * | 10/2003 | Sasai | ............................. | 382/167 |

* cited by examiner

*Primary Examiner* — Brian P Werner
*Assistant Examiner* — Dennis Rosario
(74) *Attorney, Agent, or Firm* — Ido Tuchman; William J. Stock

(57) ABSTRACT

It is an object of the present invention to output a clear, expanded image wherein step-shapes or chain-shapes of oblique lines are reduced, distortion is eliminated and no constituent lines of fonts or graphics are missing. An image transform method, for transforming original input image data into image data expanded by a ratio represented by a rational number or an integer, comprises: a vertical and horizontal interpolation unit, for reducing correlation in the vertical and horizontal directions of interpolated image data linearly expanded from an original image data input unit, and for generating first expanded image data; an oblique interpolation unit, for performing linear interpolation, based on correlation with a target pixel constituting the original image data and neighboring pixels arranged in oblique directions, using the neighboring pixels to generate second expanded image data; and a final result generator for employing the first expanded image data and the second expanded image data to generate a final image.

7 Claims, 15 Drawing Sheets

|  Column Row | 1 | 2 | 3 | 4 | 5 | 6 | 7 |
|---|---|---|---|---|---|---|---|
| 1 | 32 | 32 | 32 | 32 | 32 | 0 | 0 |
| 2 | 32 | 32 | 32 | 32 | 32 | 0 | 0 |
| 3 | 32 | 32 | 32 | 0 | 0 | 0 | 0 |
| 4 | 32 | 32 | 32 | 0 | 0 | 0 | 0 |
| 5 | 32 | 0 | 0 | 0 | 0 | 0 | 0 |
| 6 | 32 | 0 | 0 | 0 | 0 | 0 | 0 |
| 7 | 0 | 0 | 0 | 0 | 0 | 0 | 0 |

FIG. 3A

|  Column Row | 1 | 2 | 3 | 4 | 5 | 6 | 7 |
|---|---|---|---|---|---|---|---|
| 1 | * | * | * | * | * | * | * |
| 2 | * | 32 | 32 | 32 | 32 | 16 | 0 |
| 3 | * | 32 | 32 | 32 | 16 | 0 | 0 |
| 4 | * | 32 | 32 | 16 | 0 | 0 | 0 |
| 5 | * | 32 | 16 | 0 | 0 | 0 | 0 |
| 6 | * | 16 | 0 | 0 | 0 | 0 | 0 |
| 7 | * | 0 | 0 | 0 | 0 | 0 | 0 |

FIG. 3B

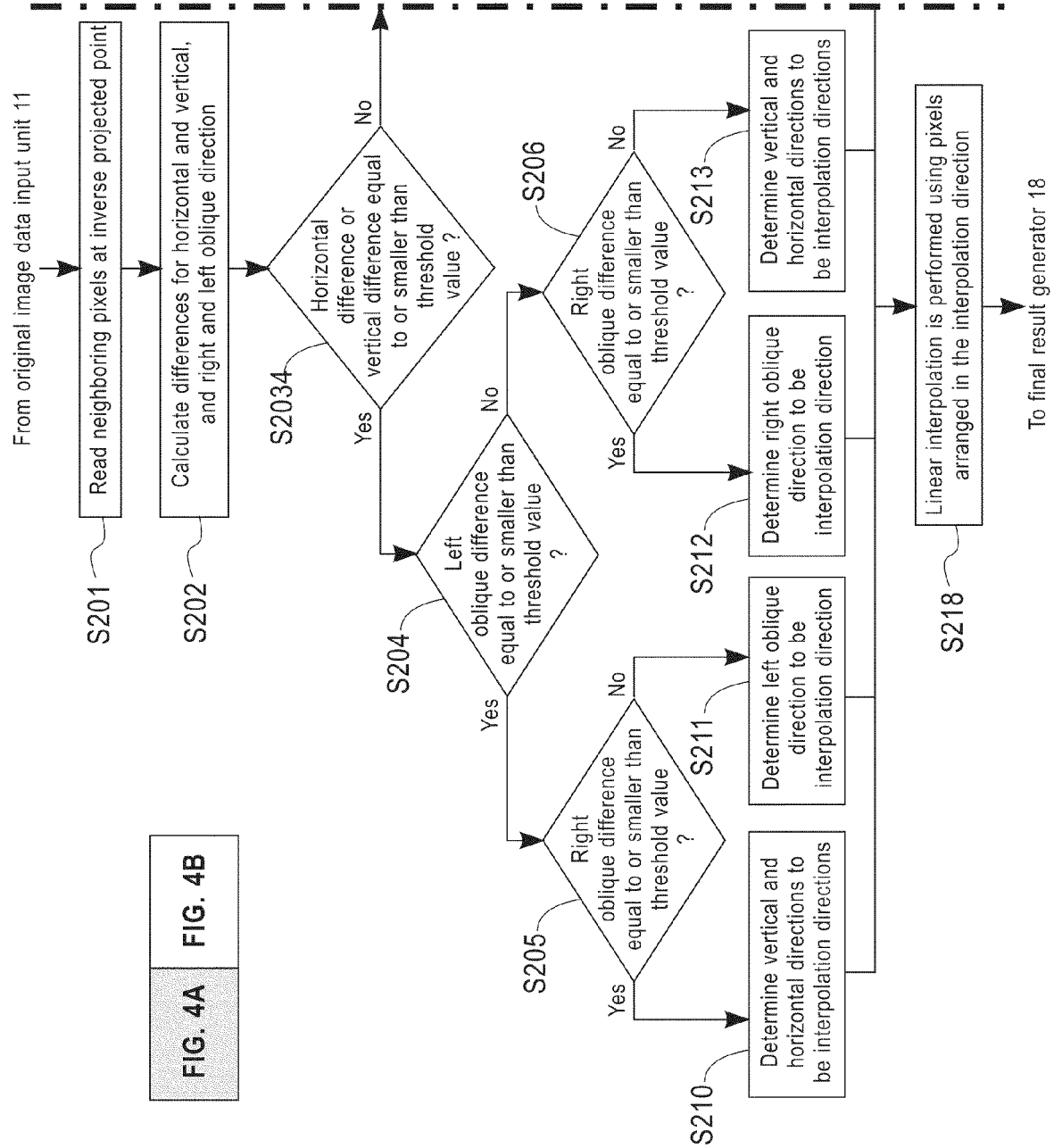

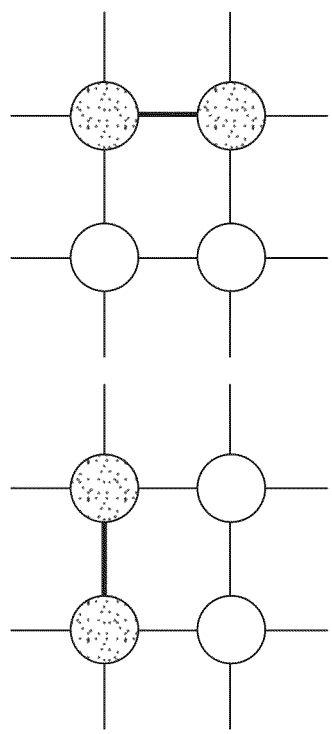
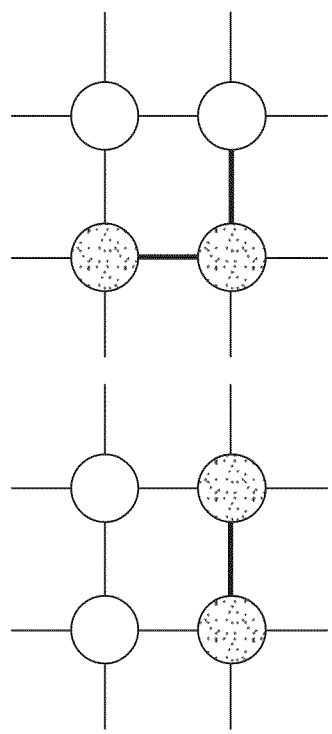
FIG. 6D
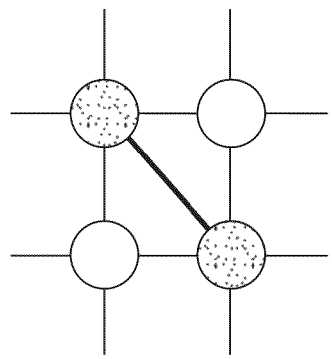
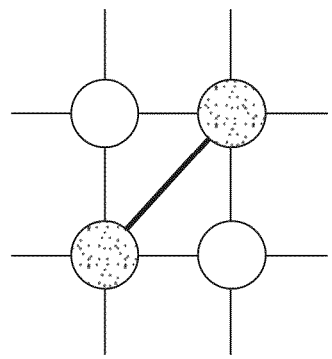
FIG. 6E  FIG. 6F
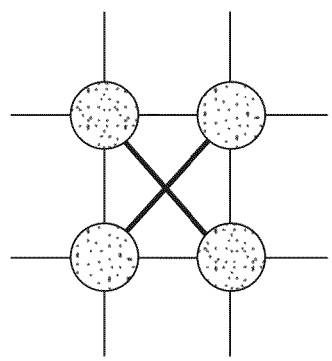
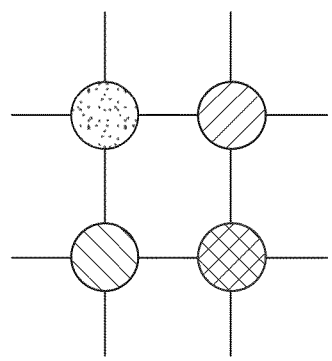
FIG. 6G  FIG. 6H

IMAGE TRANSFORM METHOD FOR OBTAINING EXPANDED IMAGE DATA, IMAGE PROCESSING APPARATUS AND IMAGE DISPLAY DEVICE THEREFORE

CROSS-REFERENCE TO RELATED APPLICATIONS

This application is a continuation of U.S. patent application Ser. No. 09/879,529 for IMAGE TRANSFORM METHOD FOR OBTAINING EXPANDED IMAGE DATA, IMAGE PROCESSING APPARATUS AND IMAGE DISPLAY DEVICE THEREFOR, filed Jun. 12, 2001 now U.S. Pat. No. 7,397,972, which claims priority under 35 U.S.C. §119 to Japanese Patent Application No. 2000-177640 filed Jun. 13, 2000, the entire text of which is specifically incorporated by reference herein.

FIELD OF THE INVENTION

The present invention relates to an image transform method for processing original input image data, and in particular, to an image transform method for reducing the step-shapes or chain-shapes of oblique lines, which appear when original input image data are expanded, and for controlling the distortion of constituent lines, and to an image processing apparatus and an image display device therefor.

BACKGROUND ART

Conventionally, the nearest neighbor method and bilinear interpolation have been used widely as interpolation methods to obtain a match between a high definition liquid crystal display (LCD) and a lower resolution personal computer (PC) screen. These interpolation methods are popular because only a small number of calculations is required for the real time processing of a high resolution image. However, it is known that the nearest neighbor method contributes to an increase in distortion in an expanded image, and therefore, the bilinear interpolation method, whereby the rough shape of an original image can be expanded, is often employed. But it is also true that bilinear interpolation tends to blur resultant images, an effect that is especially remarkable when bilinear interpolation is employed for images displayed on an image display device, such as an LCD, that does not have the low-pass characteristics.

The bilinear interpolation method is an example of the multirate processing theory called linear interpolation. And because of this, interpolation methods based on the general multirate processing theory have been proposed that use more pixels than the number employed for bilinear interpolation. For example, a multirate interpolation method using a table search method for a linear filter is disclosed in U.S. Pat. No. 5,410,616. Further, in U.S. Pat. No. 5,594,676, linear filters having different orders are prepared, and are changed in accordance with the characteristics exhibited by peripheral pixels. In addition, according to reference document 1 (IEEE Signal Processing Magazine, Vol. 16, No. 6, pp. 22-38, November 1999), pertaining to the generalization of the interpolation method, except for a point for obtaining an efficient number of calculations, a linear interpolation method whereby information loss can theoretically be minimized can be substantially provided as an interpolation method that uses a third-order B-spline. Thus, it becomes apparent that image processing using the linear interpolation method is approaching the limit of its effectiveness.

When the above method is employed for image interpolation, vertical calculations and horizontal calculations are sequentially performed, and one pixel in a low-resolution image is transformed into a set of rectangular pixel regions, so that the appearance of step-shapes or chain-shapes of oblique lines can not be prevented. In order to prevent the appearance of such shapes, it is considered effective to perform interpolation by employing a directional filter that uses peripheral pixels aligned in the direction in which an oblique line is extended. For example, in reference document 2 (IEEE Proceedings of the 1995 International Conference on Acoustics, Speech, and Signal Processing, Vol. 4, pp. 2383-2386, May 1995), and in U.S. Pat. No. 5,991,463, the use of the directional, linear interpolation methods are proposed.

These image expansion methods are required for a computer monitor and a projector in order to provide a match between a flat panel display, such as an LCD, which has a fixed pixel resolution, and an image produced by the graphics card of a PC. However, when an expansion process for an original image is performed vertically and horizontally, or in the opposite order, as with the conventional bilinear interpolation method, correlation is increased vertically and horizontally for the pixels that have been interpolated. As a result, when an oblique line is expanded, a pixel displayed on a low-resolution screen is transformed into a group of rectangular pixel regions, and a step-shape or chain-shape of oblique line appears. And even when a high accurate linear interpolation is performed using a third order B-spline, the above phenomenon becomes ever more remarkable as the expansion ratio is increased. When this phenomenon appears on the display of a high definition LCD, it seems to the user that the physical definition of the output screen differs from the actual definition.

In reference document 2, the differences in pixels are calculated for predetermined directions, and the reciprocals of values obtained for all the directions are added together to acquire the normalized weight coefficient. Linear interpolation is performed for pixels dispersed in each direction corresponding to each weight coefficient, and to provide an expanded image, the summation of the results is calculated based on the weight coefficients. In this method, linear interpolation is performed by regarding, as the dominant direction, the one in which the pixel difference is small, and this method can be considered as a method for preventing the step-shapes or chain-shapes of oblique lines. However, using this method, since in order to prevent an erroneous determination the summation is calculated by also using the interpolation results obtained for the non-dominant direction, blurring of an output image can not be avoided.

In U.S. Pat. No. 5,991,463, a bilinear interpolation technique using four adjacent pixels arranged in a specific direction is proposed as a directional interpolation method. Specifically, according to this method, first, a difference among four peripheral pixels is obtained for the determination of three directions, i.e., the right oblique, the left oblique and the vertical directions. The differences are compared with each other, and the direction having the smallest pixel difference is determined to be an interpolation direction. In addition, an additional search is performed, as needed. When the pixel differences for the three directions are substantially the same, the vertical direction is determined. When the pixel difference for the vertical direction is small and the difference for one of the oblique directions is obviously small, the pertinent oblique direction is determined. When the pixel differences for the two oblique directions are small, the same direction determination is performed for a pixel that forms an oblique line parallel to the pixels whose difference was calculated. And when the differences for the two oblique directions are small for the additional pixel, the vertical direction is determined. In this manner, as is disclosed in this publication, when interpolation is performed for one specific direction, excessive image blurring can be avoided.

However, according to the above method, an erroneous determination may be made if in an observation pixel mask used for direction determination foreground and background can not be identified, such as when white and black pixels intersect to form an X shape. When the direction can not be correctly determined, an interpolation value is obtained that is far different from the correct value, and there is a defect in the interpolation results. In addition, generally, according to the expansion method for which only oblique interpolation is performed, correlation in the vertical and horizontal directions is reduced. That is, since at the point where vertical and horizontal linear lines intersect, an image is expanded as if it is assumed as a diamond shape, instead of expanding in the original vertical and horizontal directions, the obtained image is distorted. Further, since the isolated point of the original image is determined to be the point whereat the oblique lines cross, and the image is to be expanded in the oblique directions, the isolated point is faded out, or the expansion of the image is less than it is supposed to be.

To resolve the above shortcomings, it is one object of the present invention to provide an image transform method whereby the step-shapes or chain-shapes of oblique lines are not remarkable, even when an image has been expanded by two or more times of its original size.

It is another object of the present invention to output a clear, expanded image wherein distortion is eliminated and no constituent lines of fonts and graphics are missing. It is an additional object of the present invention to perform fast image transform processing.

SUMMARY OF THE INVENTION

To achieve the above objects, according to the present invention, based on a linearly expanded image that is interpolated in the vertical and horizontal directions, or vice versa, an intermediate process image is obtained wherein the vertical and horizontal correlation is reduced. Further, the direction correlated with the target pixel is detected, and the image is expanded by using neighboring pixels arranged in the detected direction to produce a resulting image. The processing of the intermediate image and the resulting image are employed to generate a final, expanded image. Specifically, according to a first aspect of the present invention, an image transform method, for transforming original input image data into image data expanded by a ratio represented by a rational number or an integer, comprises the steps of: reducing correlation in the vertical and horizontal directions of a linearly expanded image to generate first expanded image data; performing linear interpolation, based on correlation with a target pixel constituting the original image data and neighboring pixels arranged in oblique directions, using the neighboring pixels to generate second expanded image data; and employing the first expanded image data and the second expanded image data to generate a final image.

The step of generating the first expanded image data includes the steps of: raster-scanning a window having a predetermined size wherein the target pixel and the neighboring pixels in the linearly expanded image data are included; and reducing vertical and horizontal directional correlation through a rank order processing using median operation in the window. This configuration is preferable because to perform the process for reducing the vertical and horizontal directional correlations, simple operations can be used for which no enormous amount of calculation is required.

Further, the step of generating the second expanded image data includes the steps of: determining an interpolation direction based on values of differences between the target pixel and the neighboring pixels; and performing linear interpolation in the determined direction. This step leads to relatively precise determination of interpolation direction.

The image transform method further comprises the step of: regarding, as an adjustment value, the personal preference of a user concerning image quality, wherein, at the step of generating the final image, based on the adjustment value, the final image is generated by using the first and the second expanded image data. As a result, an output image can be obtained by extracting suitable portions from the two sets of expanded image data, e.g., by reducing a bulging shape that is exaggerated by the second expanded image data and appears at a crossing point.

According to a second aspect of the invention, an image transform method comprises the steps of: forming an image by linearly expanding original image data in the vertical and horizontal directions; and reducing the vertical and horizontal directional correlation of the image through a rank order processing using, for example, median operation to generate an expanded image.

The image transform method further comprises the steps of: determining, for the expanded image, whether the contrast in the original image data can be maintained at a predetermined level; and extracting a high frequency component from the expanded image, when the contrast can not be maintained at the predetermined level, and adding the frequency component multiplied by a constant to the expanded image, or subtracting the frequency component multiplied by a constant from the expanded image. This configuration is preferable because the contrast can be maintained at a predetermined level, even when, depending on how the rank order processing is performed, the contrast in the original image can not be maintained. To determine whether the contrast is maintained at the predetermined level, the contrast of the foreground and the background of the original image is compared with the contrast of those sides of the expanded image, and the result is compared with a predetermined threshold value.

According to a third aspect of the invention, an image transform method comprises the steps of: reading a target pixel and neighboring pixels in original image data; employing the target pixel and the neighboring pixels to calculate directional differences for the horizontal, the vertical, the right oblique and the left oblique directions; employing the directional differences to determine a strong correlated direction; and performing linear interpolation for the target pixel using the neighboring pixels arranged in the strong correlated direction.

The image transform method further comprises the steps of: reading peripheral pixels arranged within a predetermined mask range adjacent to the target pixel and/or the neighboring pixels; and accumulating differences between the peripheral pixels, and between the target pixel and the neighboring pixels; and determining an interpolation direction, based on the cumulative value of the differences, and performing interpolation in the interpolation direction. As a result, even for thin lines obtained by anti-aliasing (process for fusing the dots at borders to the background), the direction of the foreground can be obtained substantially correctly.

According to a fourth aspect of the invention, an image transform method comprises: an input step of entering original image data to be expanded by a magnification of two or more; a first process step of reducing the step-shapes or chain-shapes of oblique lines appearing when the original image data are expanded by doubled or greater in size; a second process step of expanding, in the oblique direction, the structure of the original image data, and reducing a bulging shape appearing when a portion is expanded whereat vertical and horizontal lines of the original image data cross each other; and an output step of outputting an image expanded by the magnification of two or more using results of the first and second process steps.

Further, to achieve the above objects, according to a fifth aspect of the present invention, an image processing apparatus comprises: input means for entering original image data to be expanded; vertical and horizontal directional interpolation means for interpolating the original image data in the vertical and horizontal directions; vertical and horizontal directional correlation reduction means for reducing correlation of the obtained image in the vertical and horizontal directions; oblique direction detection means for detecting an oblique direction having a strong correlation with a target pixel and neighboring pixels in the original image data; and directional interpolation means for employing the neighboring pixels in the detected oblique direction to perform interpolation in the oblique direction.

The image processing apparatus further comprises: generation means for generating expanded image data based on an image obtained by the vertical and horizontal directional correlation reduction means and an image obtained by the oblique directional interpolation means. This configuration is preferable because the advantages offered by these means facilitate the output of an image the user preference, for example.

The image processing apparatus further comprises: input means for entering, as an adjustment value, the personal preference of a user concerning image quality, wherein the generation means employs the adjustment value to synthesize the image obtained by the vertical and horizontal directional correlation reduction means with the image obtained by the oblique directional interpolation means. The adjustment value entered at the input means need not be the one that is directly used by the image processing apparatus, and a sensuous input value (e.g., setup due to comparison, such as softer or clearer, or a gradual setup) relative to the personal preference of the user may be transformed for synthesization.

The vertical and horizontal directional correlation reduction means performs the ranked median value selection, such as the median operation, for the target pixel and the neighboring pixels in the linearly expanded image data, and thereby reduces the correlation of an image in the vertical and horizontal direction. This configuration is superior because a high quality, expanded image can be obtained by using a small, simple processing apparatus.

Further, the oblique direction detection means employs differences between the target pixel and the neighboring pixels to detect, with strong correlation, the oblique direction, and the oblique directional interpolation means performs linear interpolation in the oblique direction detected by the oblique direction detection means.

According to a sixth aspect of the invention, an image processing apparatus comprises: a vertical and horizontal linear interpolation unit for forming an image by linearly expanding original image data in the vertical and horizontal directions; and a vertical and horizontal directional correlation reduction processing unit for reducing, for the image, a vertical and horizontal directional correlation using a rank order processing, and for generating an expanded image.

According to a seventh aspect of the invention, an image processing apparatus comprises: an interpolation direction determination unit for reading a target pixel and neighboring pixels in original image data, for calculating directional differences between the target pixel and the neighboring pixels for vertical, horizontal, right oblique and left oblique directions, and for determining an interpolation direction based on the directional differences; and an oblique directional linear interpolation unit for performing linear interpolation for the target pixel by using the neighboring pixels arranged in the determined interpolation direction. The interpolation direction determination unit reads peripheral pixels arranged within a predetermined mask range adjacent to the target pixel and/or the neighbor pixels and adds together the differences between the peripheral pixels and the target pixel and the neighbor pixels, and determines the interpolation direction based on the cumulative value of the differences. This configuration is preferable because, when the interpolation direction can not be identified using only the directional differences among the directions, the interpolation direction can be accurately determined.

According to an eighth aspect of the present invention, an image display device, for transforming low-resolution original color image data into high-resolution expanded color image data, and for outputting the high-resolution expanded color image data, comprises: first image expansion means for outputting an expanded image wherein the vertical and horizontal structure is maintained with reducing the step-shapes or chain-shapes of oblique lines in the linearly expanded image; second image expansion means for expanding the structure of the original color image data in the oblique direction, for reducing a bulging shape that appears at intersections of lines, and for outputting an expanded image; and display means for employing the expanded images obtained by the first and the second image expansion means to display a final image.

The original color image data includes thin lines obtained by anti-aliasing, and the second image expansion means performs interpolation, while correctly identifying the foreground based on pixels constituting the original thin lines, not based on pixels obtained by anti-aliasing.

BRIEF DESCRIPTION OF THE DRAWINGS

FIGS. 3A and 3B are diagrams for explaining the reduction of a step-shape of boundary using the rank order processing.

FIGS. 6D, 6E, 6F, 6G and 6H are diagrams showing example pixel patterns.

DESCRIPTION OF THE SYMBOLS

Figure 1:
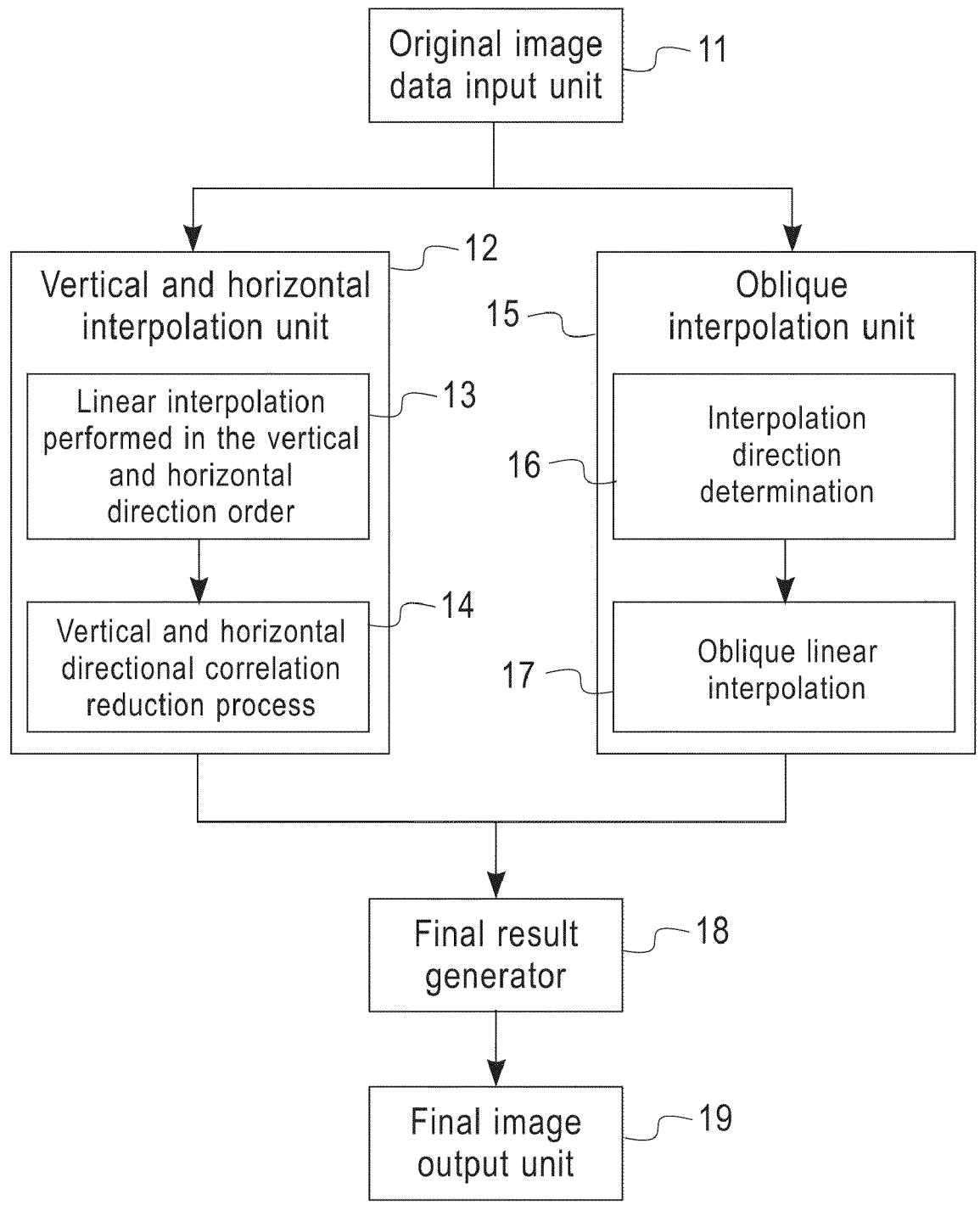
FIG. 1 is a diagram showing an image processing apparatus according to one embodiment of the present invention.

11: Original image data input unit
12: Vertical and horizontal interpolation unit
13: Linear interpolation performed in the vertical and horizontal direction order
14: Vertical and horizontal directional correlation reduction process
15: Oblique interpolation unit
16: Interpolation direction determination
17: Oblique linear interpolation
18: Final result generator
19: Final image output unit

DETAILED DESCRIPTION OF THE INVENTION

Preferred Embodiment

The preferred embodiment of the present invention will now be described in detail while referring to the accompanying drawings.

An image processing apparatus according to this embodiment is, for example, a liquid crystal display monitor, which receives, from a connected host apparatus, such as a PC, original image data consisting of R (red), G (green) and B (blue) color signals for a text screen or a computer aided design (CAD) screen, and performs a resolution transform for the image data, after which it outputs the results on a display unit, such as a liquid crystal display cell. For an LCD monitor or a notebook PC, this liquid crystal display monitor can be implemented, for example, by an internal LCD controller. The image processing apparatus is effective when, for example, original color image data generated by a low-resolution VGA (Video Graphics Array) (640×480 dots) graphic chip is displayed on a high-resolution UXGA (Ultra Extended Graphics Array) (1600×1200 dots) LCD display. Further, for a notebook PC the image processing apparatus is implemented to include the host side. It should be noted that no further detailed explanation will be given for a liquid crystal display cell and the X and Y drivers that supply power to the cell.

In this embodiment, to improve the conventional method whereby one pixel in an original image is expanded as a rectangular group of pixels, and the oblique lines of the original image assume a step shape or a chain shape in the resultant image, a method and an apparatus are proposed for generating a clear, expanded image wherein the structural balance of the characters or the graphic design of the original image is maintained. The factors for determining the adequateness of an expansion are those that are considered to be effective, so that a user feels natural to an expanded image when he or she looks at a graphic design, such as a text screen or a computer aided design screen, displayed on a high-definition LCD. It should be noted that this method can also be applied when a user views a natural image, and is not limited in use only to an expanded image displayed on an LCD screen.

FIG. 1 is a diagram illustrating an image processing apparatus according to the embodiment of the present invention. The image processing apparatus roughly comprises: an original image data input unit 11, a vertical and horizontal interpolation unit 12, an oblique interpolation unit 15, a final result generator 18 and a final image output unit 19. The original image data input unit 11 receives original image data during the process performed for each coordinate, and pixel values are supplied thereto in a time-series manner as, for example, a one-dimensional sequential data stream that is received as a horizontal scan line. The vertical and horizontal interpolation unit 12 performs in the named order, for the original image data received from the original image data input unit 11, a linear interpolation 13 process in the vertical and horizontal directions, and a vertical and horizontal directional correlation reduction process 14 for reducing the vertical and horizontal directional correlation. Thus, a large, step-shape portion, acquired as a result of the linear interpolation 13 expansion process, is changed, and a smooth shape is produced by the vertical and horizontal directional correlation reduction process 14 and is subsequently output. The oblique interpolation unit 15 performs, for the original image data received from the original image data input unit 11, a process 16 for determining the interpolation direction and an oblique linear interpolation 17. Thus, the oblique direction can be accurately determined and the interpolation process can be performed in the oblique direction.

The final result generator 18 synthesizes, at a predetermined ratio, the results received from the vertical and horizontal interpolation unit 12 and the oblique interpolation unit 15 in order to maintain the character or graphic design balance. The predetermined ratio for this synthesization can be obtained as an adjustment value for image quality that reflects the personal preference of a user. Further, this adjustment value can be obtained, for example, by a user employing input means (not shown) of a PC to enter data representing his or her reaction to the display of an expanded image. The final image output unit 19 outputs the results obtained from the final result generator 18 to a liquid crystal display cell driver, for example, which displays the image obtained by this embodiment on a liquid crystal display.

When a low-resolution PC screen image is to be expanded and displayed on a high-definition LCD, according to many US expansion methods, an oblique one pixel-width line in the original image is transformed into a step-shape or chain-shape line consisting of a rectangular group of pixels. As the main factor in this case, it is assumed that for the calculation dependence is to be placed on the sequential arrangement of the interpolated pixels, and a strong correlation, such as that in the vertical and horizontal directions, occurs among interpolated pixels. Whereas, if the calculation is performed by using peripheral pixels arranged in the direction in which the step-shape or chain-shape line appears, this problem may be avoided. However, at the same time, the vertical and horizontal correlation is reduced, and at the portion where the vertical and horizontal lines of a font cross each other, an oblique crossing that differs from the original image appears, so that the balance of the font is distorted, or at the point at which the lines cross a large round dot will appear. Further, if an isolated point on an original image is interpolated with weak correlation in the vertical and the horizontal directions, the isolated point will be regarded as a crossing point for oblique lines, and will be expanded in an oblique direction, so that it is faded and blurred. In this embodiment, in order to avoid these phenomena, the final result generator 18 generates a final expanded image using the vertical and horizontal interpolation results, which are output by the vertical and horizontal interpolation unit 12 in order to maintain design balance, and the oblique interpolation results, which are output by the oblique interpolation unit 15 in order to reduce the step-shapes or chain-shapes of oblique lines.

Figure 2:
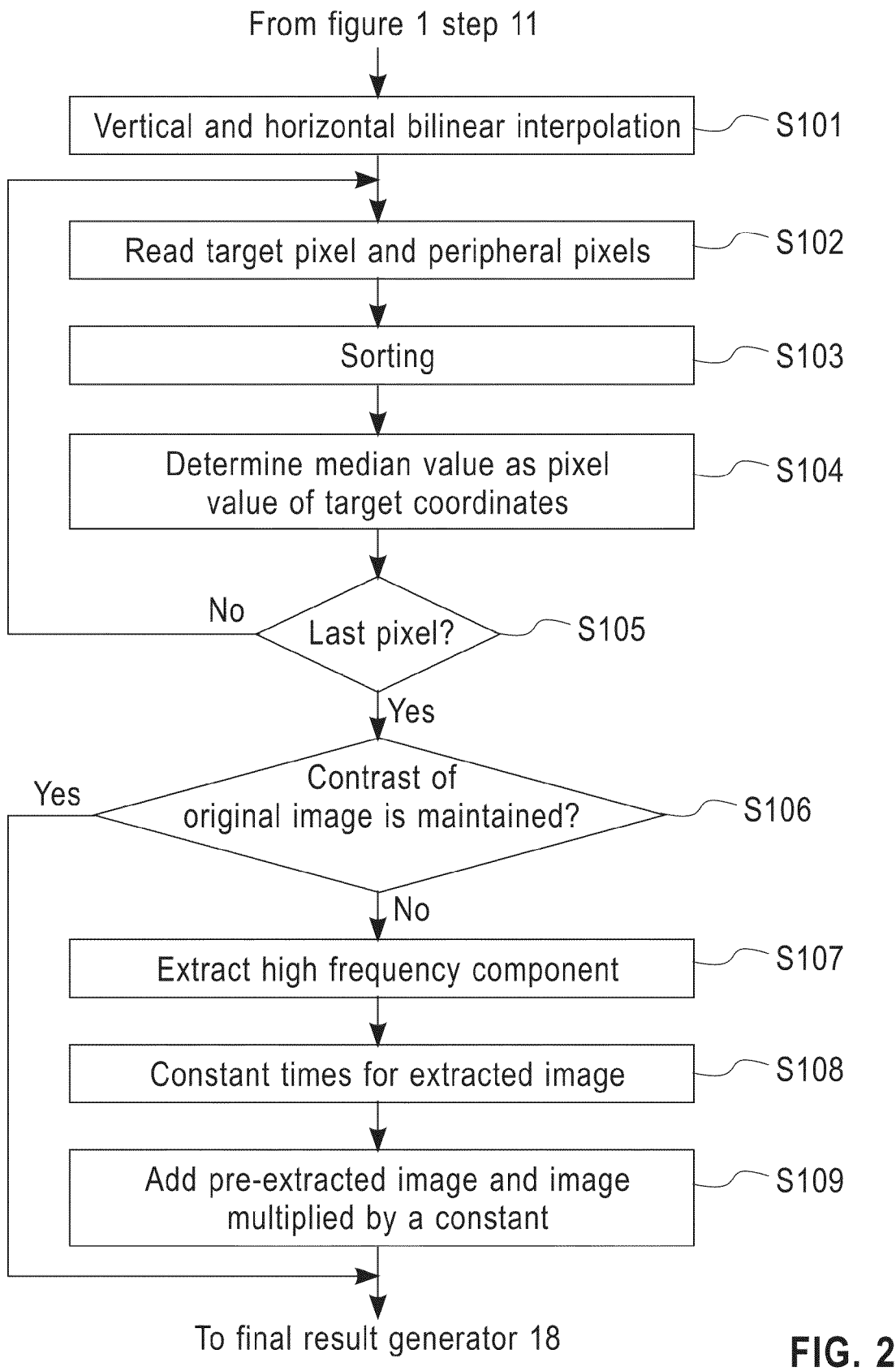
FIG. 2 is a flowchart for explaining the processing performed by the vertical and horizontal interpolation unit 12.

FIG. 2 is a flowchart for explaining the processing performed by the vertical and horizontal interpolation unit 12. First, vertical and horizontal bilinear interpolation is performed for the original image data received from the original image data input unit 11 (step 101). The vertical and horizontal linear interpolation 13 described while referring to FIG. 1 can be performed using the conventional bilinear interpolation method, and cubic convolutional interpolation or interpolation using a B-spline can also be performed, so that the interpolation method is not especially limited. Following this, as the vertical and horizontal directional correlation reduction process 14, a target pixel and peripheral pixels are read (step 102) and sorted (step 103), and the median value is determined as the pixel value at targeted coordinates (step 104). Specifically, the peripheral pixels that are included in a mask of an integer matrix that does not exceed the expansion ratio (e.g., a mask of two rows and two columns if the expansion ratio is 2.5) are sorted in order in accordance with value, and the median value is output as the process result. As the process for outputting the median value, a rank order processing is used for outputting a predetermined order value, or a process for repetitively copying the pixels in the mask and sorting them, and for performing a rank order processing for the sorted results can be employed. So long as the vertical and horizontal directional correlation can be reduced, any acceptable arbitrary process can be employed. Then, whether the current pixel is the last one is determined (step 105). If the pixel is not the last one, program control returns to step 102 to repeat the above processing. If the current pixel is the last one, program control advances to step 106.

At step 106, a check is performed to determine whether the contrast of the original image can be maintained through the above processing. For this determination, the difference in the luminances at a boundary portion is obtained and is compared with a threshold value. When the luminance difference is smaller than the threshold value, it is ascertained that the contrast can not be maintained. Whether or not the enhancement process is required depends on the employment of the rank order, and when the contrast of the original image can be maintained, the pixel value determined at step 104 is output unchanged to the final result generator 18. But when it is determined the contrast of the original image can not be maintained, the image enhancement process is performed at steps 107 to 109. The process performed at steps 107 to 109 is an image sharpening process called unsharp masking. During this process, vertical and horizontal directional correlations are reduced at the portion whereat the median value is output, and the high frequency component of the image is enhanced in order to restore the image contrast obtained from the vertical and horizontal linear interpolation 13. Specifically, the high frequency component is extracted from the image (step 107), and the extracted image is multiplied by a constant value (step 108). The pre-extracted image and the multiplied image are added together (step 109), and the result obtained at step 109 is output to the final result generator 18.

As is described above, the vertical and horizontal interpolation unit 12 can linearly expand original image data in the vertical and horizontal directions, or vice versa, and can thereafter perform a non-linear process for changing the vertical and horizontal directional image that is obtained to a set of non-directional correlation pixels. With this configuration, a non-linearly expanded image, wherein the step-shapes or chain-shapes of oblique lines are reduced, can be output without distorting the balance of the linear structure forming a character or a graphic in the original image, and without losing an isolated point in the image.

FIGS. 3A and 3B are diagrams for explaining the reduction of a step-shape of boundary using the above described rank order processing. In FIG. 3A is shown the state obtained through the expansion process for which the vertical and horizontal linear interpolation 13 in FIG. 1 is used, and in FIG. 3B is shown the state obtained when the vertical and horizontal directional correlation reduction process 14 in FIG. 1 is used. In FIGS. 3A and 3B, the pixel values in 49, 7×7 windows are represented as expansion results, with "32", for example, being defined as bright and "0" being defined as dark. A thick solid line indicates a boundary line, and as is indicated by the thick solid line in FIG. 3A, a boundary having large steps occurs as the result of the expansion process for which only the vertical and horizontal linear interpolation 13 is used.

In this embodiment, the rank order processing is performed after the expansion process in FIG. 3A for which the vertical and horizontal linear interpolation 13 is used. Specifically, the rank order processing is performed by raster-scanning a window, enclosed by a broken line 21 in FIG. 3A, in the direction indicated by an arrow 22, and the pixel positions are adjusted in accordance with the even numbers of the pixels in the window. In the area enclosed by the broken line 21, four windows are defined by a pixel 23 at the second row and the second column, a pre-scan pixel (second row and first column) and the pixels along the preceding line (first row and first column and second column), and the median operation, for example, is performed for the four windows to determine the output value for the pixel 23 on the second row in the second column. The results obtained by the rank order processing are shown in FIG. 3B. The "*" symbols along the first row and along the first column represent "Don't care", because the values of the pixels before the scanning and along the preceding row are unknown.

The pixel, for example, on the second row in the sixth column in FIG. 3A is "0". When the median operation is performed for this pixel, the pre-scan pixel (second row and fifth column) is "32" and the pixels along the preceding row are "32" and "0". When these pixels are rearranged in the ascending order, "0, 0, 32, 32", the median value is "16". As a result, as is shown in FIG. 3b, the pixel on the second row in the sixth column is transformed to "16". Similarly, the pixel, for example, on the third row in the fourth column in FIG. 3A is "0", and the vertical and horizontal pixel values in the window are rearranged in the ascending order, "0, 32, 32, 32". Therefore, the median value is "32", and the output value is indicated on the third row in the fourth column in FIG. 3B. When the rank order processing has been performed in this manner, it is apparent that, as indicated by the thick solid line in FIG. 3B, the large steps are removed from the boundary, and further, the boundary is interpolated with the median values. As a result, a clear and smooth expanded image can be obtained at the current resolution.

The processing performed by the vertical and horizontal interpolation unit 12 will now be described by using a general calculation example.

In this example, a calculation will be described for the processing including bilinear interpolation, the use of a median filter, and the unsharp masking for an image expansion of 2.5 times.

First, by using the following equation, the weighted mean using the distance of interpolation value $B_k[X]$ is performed for real number coordinates X between two adjacent pixels $S[X_k]$ and $S[X_{k+1}]$ in an original image.

$$B_k[X] = sS[X_k] + (1-s)S[X_{k+1}], \quad \text{[Equation 1]}$$

for $X_k \leq X \leq X_{k+1}$, $s = X - X_k$

Bilinear interpolation is the method used to perform this calculation for the order in the vertical and horizontal directions.

When the expanded result obtained by bilinear interpolation is defined as B(x, y), and the size of the mask is 2×2, as previously described, the median filter employs the following equation for the processing.

$$M(x,y) = \text{median}\{[B(x-1,y-1), B(x-1,y), B(x,y-1), B(x,y)]\} \quad \text{[Equation 2]}$$

In this example, when the number of vector elements of the target is odd, the median value for output is provided by median operation, or when the number of elements is even, the output value is determined in the next process. For the above equation, when the pixel values are rearranged in the ascending order, as $[R_1, R_2, R_3, R_4]$ ($R_1 \leq R_2 \leq R_3 \leq R_4$), the output provided by median operation is $$M(x,y) = (R_2 + R_3)/2 \quad \text{[Equation 3]}$$

When the output of an integer value is expected, a floor calculation for rounding off the calculation results in the negative infinite direction is performed, and the result $$\lfloor M(x,y) \rfloor \quad \text{[Equation 4]}$$

is employed as the output value. Further, for the extraction of a high frequency component, simple means can be employed, such as a second-order Volterra filter in the following equation proposed in the IEEE Transactions on Image Processing, Vol. 5, No. 6, pp. 950-963, June 1996.

$$V(x,y) = 2M^2(x,y) - M(x,y-1) \circ M(x,y+1) - M(x-1,y) \circ M(x+1,y) \quad \text{[Equation 5]}$$

In the same manner as in a method frequently used for unsharp masking, a specific scalar value γ is provided to obtain the final results using the following equation.

$$N(x,y) = M(x,y) + \gamma \circ V(x,y) \quad \text{[Equation 6]}$$

In this case, instead of a Volterra filter, a Laplacian filter may be employed for a high-pass filter, and the image enhancement method is not thereby limited.

As is described above, when the thus arranged vertical and horizontal interpolation unit 12 in FIG. 1 is employed, a step-shape or chain-shape of an oblique line can be reduced, while output with no distortion is maintained in the vertical and horizontal crossed lines of a character that is obtained using common linear interpolation. However, since this process is primarily for the rearrangement of the pixels in order to reduce the vertical and horizontal correlation, a problem of uneven coloration arises. Thus, in this embodiment, to resolve this problem using the interpolation results wherein the step-shapes or chain-shapes of oblique lines and uneven coloration appear less frequently, the oblique interpolation unit 15 in FIG. 1 is provided, even though the vertically and horizontally crossed lines are distorted.

Figure 4B:
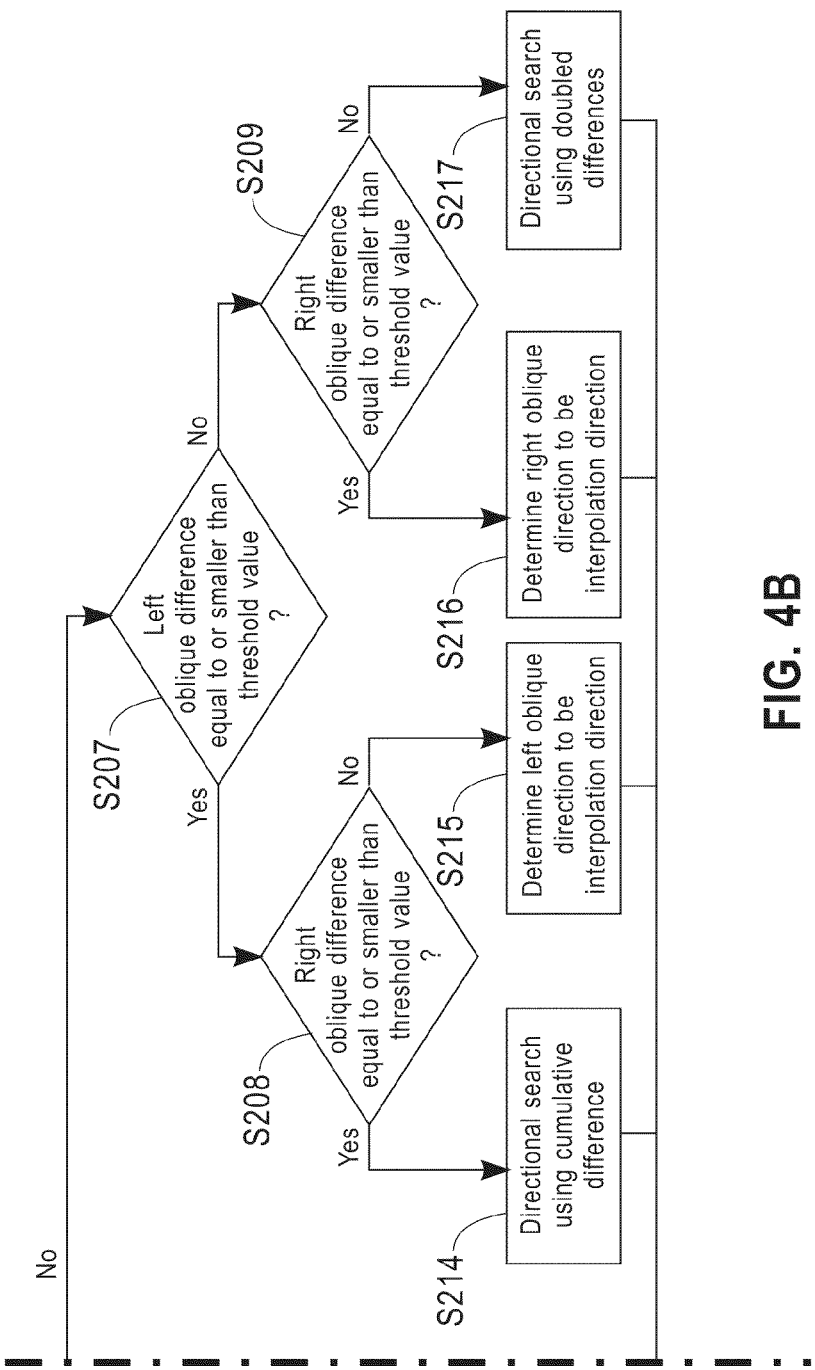
FIG. 4 is a flowchart for explaining the processing performed by the oblique interpolation unit 15.

FIG. 4 is a flowchart for explaining the processing performed by the oblique interpolation unit 15. In this embodiment, basically, the interpolation direction determination process 16 is performed, and then the oblique linear interpolation process 17 is performed, wherein pixels in the interpolation direction are employed for linear interpolation.

First, the neighboring pixels at an inverse projected point of a target expansion point are obtained from the original image data input unit 11 (step 201), and differences for the horizontal and the vertical, and the right and the left oblique directions are calculated (step 202). Specifically, when inverse projection is performed from the target coordinates obtained by expansion to the original coordinates, four peripheral pixels are employed to calculate differences in the horizontal and the vertical, and the right and the left oblique directions. Then, the differences are compared with each other, i.e., a check is performed to determine whether the horizontal or vertical difference is equal to or smaller than a threshold value (step 203).

When the horizontal or the vertical difference is equal to or smaller than the threshold value, a check is performed to determine whether the difference in the left oblique direction is equal to or smaller than the threshold value (step 204). And if the difference in the left oblique direction is equal to or smaller than the threshold value, a check is performed to determine whether the difference in the right oblique direction is equal to or smaller than the threshold value (step 205). Then, should the difference be equal to or smaller than the threshold value, i.e., when the difference in each of the two oblique directions is equal to or smaller than the threshold value, the vertical and horizontal directions are determined to be interpolation directions (step 210). Whereas if at step 205 the difference in the right oblique direction is greater than the threshold value, the left oblique direction is determined to be the interpolation direction (step 211). If at step 204 the left oblique direction is found to be greater than the threshold value, a check is performed to determine whether the difference in the right oblique direction is equal to or smaller than the threshold value (step 206). In this case, if the difference in the right oblique direction is equal to or smaller than the threshold value, the right oblique direction is determined to be the interpolation direction (step 212). But if at step 206 the difference in the right oblique direction is found to be greater than the threshold value, then the vertical and horizontal directions are determined to be interpolation directions (step 213).

If at step 203 the difference in the horizontal or vertical direction is greater than the threshold value, a check is performed to determine whether the difference in the left oblique direction is equal to or smaller than the threshold value (step 207). Then, when that difference is equal to or smaller than the threshold value, a check is performed to determine whether the right oblique difference is equal to or smaller than the threshold value (step 208). And if the difference is equal to or smaller than the threshold value, i.e., when the difference in each of the two oblique directions is equal to or smaller than the threshold value, the directional search is performed-using the cumulative value of the differences (step 214). But when at step 208 the difference in the right oblique direction is greater than the threshold value, the left oblique direction is determined to be the interpolation direction (step 215). Again, if at step 207 the difference in the left oblique direction is greater than the threshold value, a check is then performed to determine whether the difference in the right oblique direction is equal to or smaller than the threshold value (step 209). And when the difference in the right oblique direction is equal to or smaller than the threshold value, the right oblique direction is determined to be the interpolation direction (step 216). If, however, at step 209 the difference in the right oblique direction is greater than the threshold value, the directional search is performed using a doubled difference (step 217). It should be noted that the threshold value used throughout this process is an arbitrary value, determined while consideration is given to the states of the pixels, and is stored in a memory (not shown).

Finally, based on a determination made at one of steps 210 to 217, linear interpolation is performed using pixels arranged in the interpolation direction (step 218). Thereafter, the results obtained by linear interpolation are output to the final result generator 18.

FIGS. 5A to 5C and 6D to 6H are diagrams showing example pixel patterns that correspond to the respective cases described in FIG. 4. In these diagrams, the relationship between the pixel values is conceptually represented, whose relationship consists of an inverse projected point of a target expansion point and the neighboring pixels of the projected point, and in this embodiment, bilinear interpolation is performed using these four neighboring pixels. The pixel pattern in FIG. 5A corresponds to step 210 in FIG. 4, the pixel pattern in FIG. 5B corresponds to step 211, and the pixel pattern in FIG. 5C corresponds to step 212. Further, the pixel pattern in FIG. 6D corresponds to step 213, the pixel pattern in FIG. 6E corresponds to step 215, the pixel pattern in FIG. 6F corresponds to step 216, the pixel pattern in FIG. 6G corresponds to step 214, and the pixel pattern in FIG. 6H corresponds to step 217. In these pixel patterns, the circles represent pixels, and when the pixel values are near each other, i.e., when the difference between them is equal to or smaller than a threshold value, the pixels are connected by thick, solid lines.

Figure 5A:
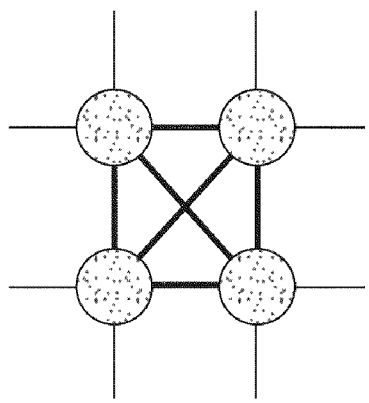
FIGS. 5A, 5B and 5C are diagrams showing example pixel patterns.

According to the determination at step 210 in FIG. 4, the pixel pattern in FIG. 5A is that found when the differences in all the horizontal and vertical, and right and left oblique directions are equal to or smaller than the threshold value and are near each other. In this case, oblique interpolation need not be performed, and conventional interpolation is performed in the vertical and horizontal directions.

Figure 5B:
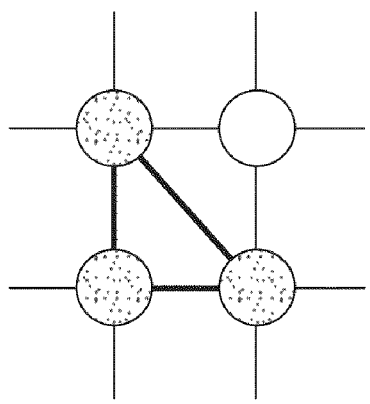
Figure 5B:
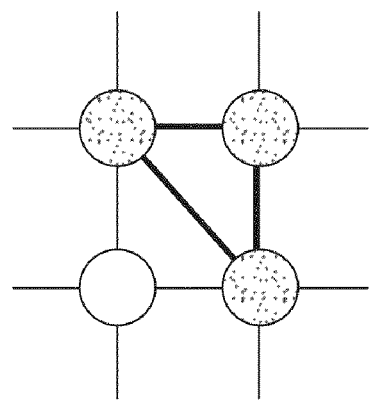
Figure 5C:
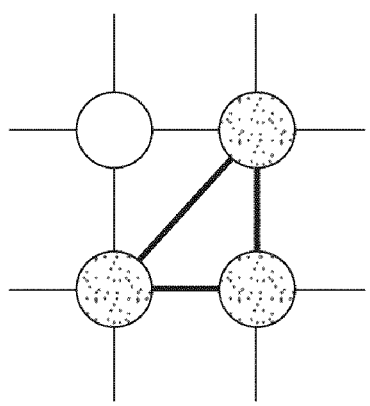
Figure 5C:
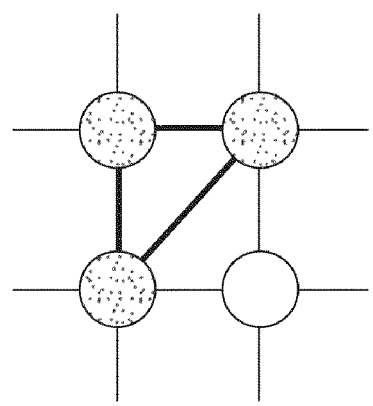

When the difference in the vertical or horizontal direction is equal to or smaller than the threshold value, and when the difference in one of the oblique directions is also equal to or smaller than the threshold value, the pertinent oblique direction is determined to be the interpolation direction. In the other cases, the vertical and horizontal directions are determined to be the interpolation directions (steps 211, 212 and 213). The pixel pattern when the left oblique direction is determined to be the interpolation direction is shown in FIG. 5B; the pixel pattern when the right oblique direction is so determined is shown in FIG. 5C; and the pixel patterns in the other cases when the vertical and horizontal directions are so determined are shown in FIG. 6D. When the difference in the horizontal or vertical direction is greater than the threshold value, the differences in the oblique directions are compared as shown in the pixel patterns in FIGS. 6E and 6F, and the direction having a value smaller than the threshold value is determined to be the interpolation direction (steps 215 and 216).

At this time, the following two cases must also be coped with. In the first case, as is shown in FIG. 6G, the difference in the horizontal and vertical directions are equal to or greater than the threshold value, and the differences in the right and left oblique directions are equal to or smaller than the threshold value. Here, the differences between peripheral pixels that are adjacent to the diagonal lines connecting the above four neighboring pixels are added together, and the cumulative value is employed to determine the interpolation direction (step 214 in FIG. 4).

Figure 7:
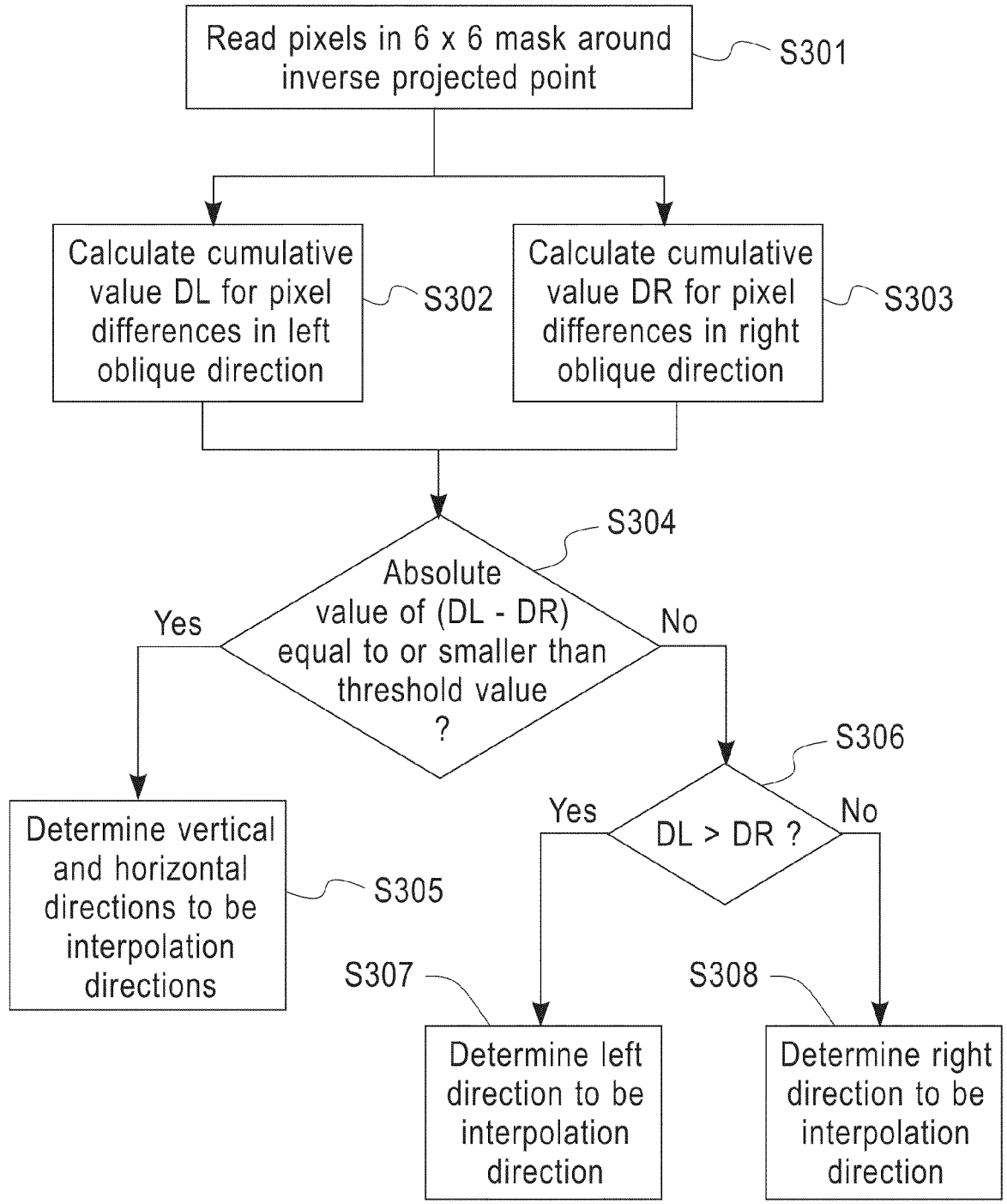
FIG. 7 is a flowchart for explaining directional search processing using a cumulative difference.

FIG. 7 is a flowchart for explaining a directional search performed using the cumulative value of differences. First, the pixels in a 6×6 mask around the inverse projected point are read (step 301). The difference accumulation range is so defined that it is large enough to cover the essential structure, in the original image, of a font segment of one pixel line. In many cases, a 6×6 mask range can provide a sufficient window size that has two more peripheries than a 2×2 window. Here it should be noted, however, that no limit is imposed on the ranges that can be used for masks.

The cumulative value DL of the pixel difference values for the left oblique direction is obtained (step 302), as is the cumulative value DR of the pixel difference values for the right oblique direction is obtained (step 303). Thereafter, a check is performed to determine whether the absolute value for (DL−DR) is equal to or smaller than a threshold value (step 304). When the absolute value is equal to or smaller than the threshold value, the vertical and the horizontal directions are determined to be the interpolation directions (step 305). When at step 304 the absolute value for (DL−DR) is greater than the threshold value, the cumulative values DL and DR are compared (step 306). If the cumulative value DL, for the pixel difference values in the left oblique direction, is greater, the left direction is determined to be the interpolation direction (step 307). Whereas when the cumulative value DR, for the pixel difference values in the right oblique direction, is greater, the right direction is determined to be the interpolation direction (step 308). In this manner, the side having the smaller cumulative value is determined to be the background, and the opposite diagonal direction is identified as the interpolation direction. When the difference between the cumulative value for the right oblique direction and the cumulative value for the left oblique direction is equal to or smaller than a threshold value, the vertical and horizontal directions are determined to be the interpolation directions.

Figure 8A:
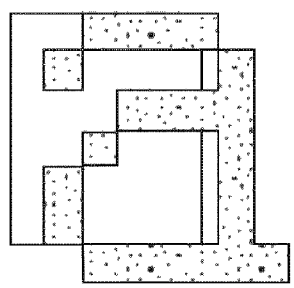
FIGS. 8A and 8B are diagrams showing example pixel patterns for which a cumulative difference is employed.
Figure 8B:
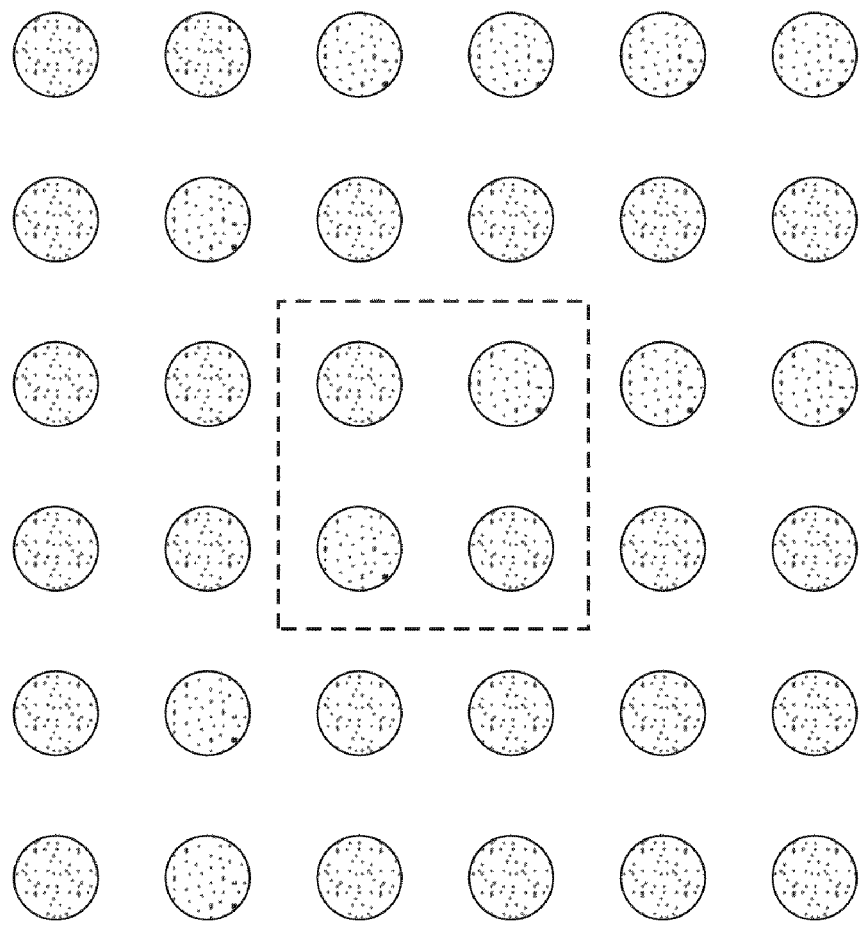

FIGS. 8A and 8B are diagrams showing an example pixel pattern for which the cumulative value of the differences is employed. The pixel pattern of a portion of the alphabetical character "a", enclosed by a thin line in FIG. 8A, is shown in FIG. 8B. As is shown in FIG. 8B, the crossing of the foreground and background in a small font has a line width of one dot. When the dot dimensions 6×6 are used to view such a font, it is found that the number of pixels used for the foreground of the font is smaller than the number of pixels used for the background. Therefore, the simplest way to identify the foreground is to compare the number of like colored pixels. However, for thin lines obtained, for example, by anti-aliasing (the process used for fusing the dots at the boundary with the background), if the thin lines cross, due to the anti-aliasing, the color of the pixels at the boundary is mixed with the color used on the background, and the number of pixels having mixed colors is smaller than the number of originally colored pixels on the foreground. In this embodiment, therefore, for each color, color differences are accumulated for an entire area within a dimensionally defined space. Thus, since the color of pixels obtained by anti-aliasing is closer to the color of the background, the accumulation difference decreases, and the color used for the foreground is correctly detected as the color having the largest accumulation difference.

An explanation will now be given for the second case that must be coped with. In the second case, as is shown by the pixel pattern in FIG. 6H, each of the differences in the horizontal and vertical directions and in the right and left oblique directions are greater than the threshold value (step 217 in FIG. 4). In this case, a directional search using a doubled difference is performed.

Figure 9:
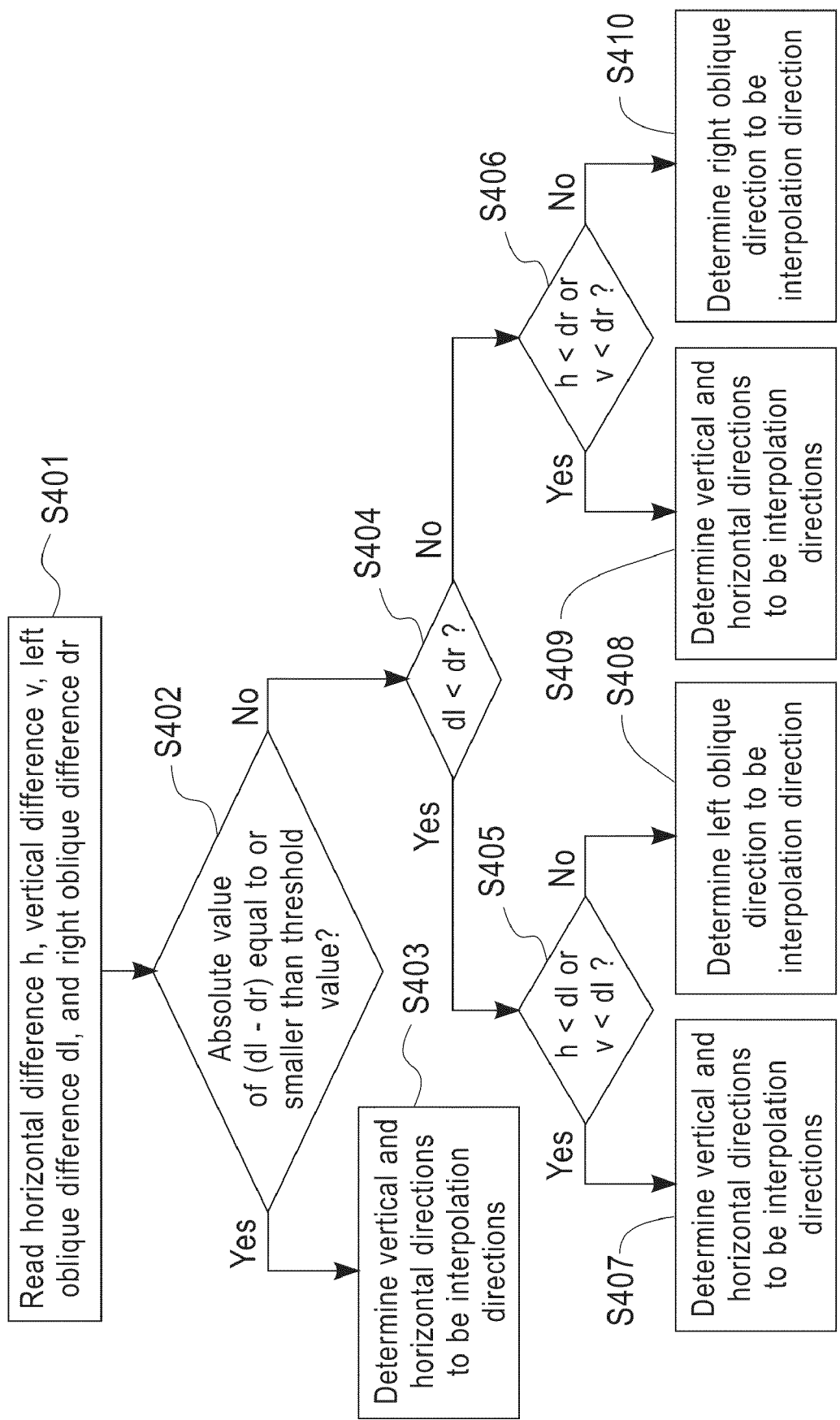
FIG. 9 is a flowchart for explaining the directional search processing using a doubled difference.
Figure 10A:
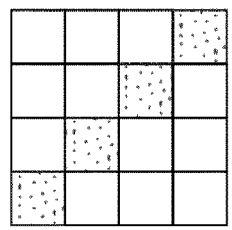
FIGS. 10A, 10B and 10C are diagrams for explaining an oblique line before expansion and a final image obtained using the conventional expansion method.
Figure 10B:
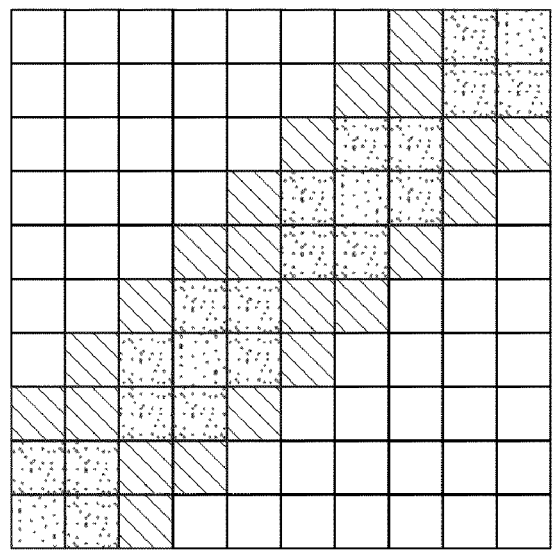
Figure 10C:
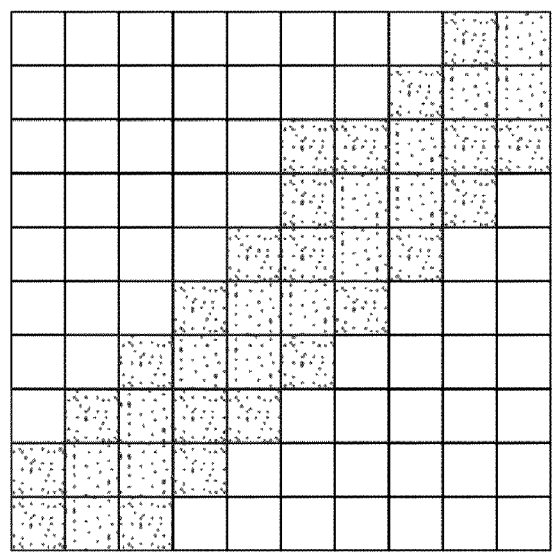

FIG. 9 is a flowchart for explaining a directional search performed using a doubled difference. For this process, first, a horizontal difference h, a vertical difference v, a left oblique difference dl and a right oblique difference dr are read (step 401). Then, the process is branched, depending on whether the absolute value of a difference between the oblique differences is equal to or smaller than the threshold value, i.e., a check is performed to determine whether the absolute value of (dl−dr) is equal to or smaller than the threshold value (step 402). If the absolute value is equal to or smaller than the threshold value, the interpolation direction is determined to be the vertical and the horizontal directions (step 403). But if the absolute value is greater than the threshold value, the differences in the right and left oblique directions are compared (step 404).

When at step 404 dl<dr, i.e., when the difference dl in the left oblique direction is smaller, a check is performed to determine whether h<dl or v<dl is satisfied between the left oblique difference and either the horizontal difference or the vertical difference (step 405). When h<dl or v<dl, the interpolation direction is determined to be the vertical and horizontal directions (step 407). When h<dl or v<dl is not satisfied, i.e., the difference in the left oblique direction is smaller, the left oblique direction is determined to be the interpolation direction (step 408).

Similarly, when dl<dr is not satisfied at step 404, i.e., when the difference dr in the right oblique direction is smaller, a check is performed to determine whether h<dr or v<dr is satisfied between the right oblique difference and the horizontal difference or the vertical difference (step 406). When h<dr or v<dr, the interpolation direction is determined to be vertical and the horizontal directions (step 409). But if h<dr or v<dr is not satisfied, i.e., when the right oblique difference is smaller, the right oblique direction is determined to be the interpolation direction (step 410).

Thus, the same linear interpolation as the conventional bilinear interpolation is performed by using four neighboring pixels arranged in the thus determined interpolation direction and at the inverse projected point. It should be noted that when the pixels in the oblique direction are employed, the distance in the oblique direction can be employed as the distance between the original image pixel and the interpolation pixel used for bilinear interpolation. Further, when the distances along the vertical and horizontal directions are employed, because of the similarity in the relationship established for the distance ratio, substantially the same results can be obtained as when an oblique direction is employed. Note that the number of directional divisions used in the above explanation is only an example, and that another number may be employed.

As is described above, since, in this embodiment, unlike in U.S. Pat. No. 5,991,463, the oblique interpolation unit 15 determines the direction using the cumulative difference values, it can be expected that reliability will be statistically improved and that the number of erroneous determinations will be reduced. As is understood from the pixel selection method, the process performed by the oblique interpolation unit 15 renders the step-shapes or chain-shapes of oblique lines substantially not remarkable. Further, since the reduction of the correlation, which is caused by the vertical and horizontal directional correlation reduction process performed by the vertical and horizontal interpolation unit 12, does not occur, uneven coloration is not remarkable in an output image expanded by a multiple of two or more. However, according to this method, the pixels in the oblique directions are employed for a Chinese (Kanji) character wherein many lines cross vertically and horizontally. Thus, the balance of the image obtained by expanding a character or graphic included in the original image are distorted; a large round dot (a bulging shape), for example, appears at crossing points in the original image; and following the image expansion, an isolated point is small and blurred.

Therefor, in this embodiment, the non-linear interpolation result obtained by the vertical and horizontal interpolation unit 12, and the result obtained by the oblique interpolation unit 15 are employed together, so that the disadvantages of the two offset each other and their advantages are established. The main advantage of the non-linear interpolation result obtained by the vertical and horizontal interpolation unit 12 is that the balance of characters and graphics is maintained. The advantage of the interpolation result obtained by the oblique interpolation unit 15 is a reduction in step-shapes or chain-shapes of oblique lines and in uneven coloration. As an example of the generation of an image for which these two advantages are provided, when an image obtained using non-linear interpolation is represented by N(x,y) and an image obtained using oblique interpolation is represented by S(x,y), a final image R(x,y) can be obtained by using the adjustment value α.

$$R(x,y)=\alpha N(x,y)+(1-\alpha)S(x,y) \qquad \text{[Equation 7]}$$

Since the image for which the two advantages are provided is generated by using the adjustment value α, it is possible to obtain a clear final image wherein a step-shape or chain-shape of oblique line or uneven coloration in the same color area is not noticeable, and the balance of the lines composing a character or graphics in an original image is not distorted. As is described above, the adjustment value α can be determined from an entry made by a consonant with his or her personal preference. Further, the user entry need not be the value α, and based on the predetermined value set by the user, the adjustment value may be transformed internally by the image processing apparatus. As an example setup by a user, a sensuous expression, such as softness or clarity, can be designated using a number of levels by employing a display or a pointing device.

FIGS. 10 to 14 are diagrams for explaining the final image in this embodiment when an expansion of 2.5 times is employed. An oblique line before expansion is shown in FIG. 10A, and the result obtained by the expansion of the oblique line in FIG. 10A using common bilinear interpolation is shown in FIG. 10B. Next, in FIG. 10C, the result is shown that is obtained by interpolating the oblique line in FIG. 10A using a third-order B-spline. The common bilinear interpolation shown in FIG. 10B is the expansion method currently equipped in many LCD monitors, and it is apparent that when this method is used to expand an image, the step-shape or chain-shape of oblique line is remarkable. Since the interpolation for which the third-order B-spline in FIG. 10C is used, is regarded as a method for obtaining a precision near the theoretical upper limit that can be achieved by linear interpolation, this method is shown for comparison. It is apparent, however, that even when interpolation using a third-order B-spline is employed, step-shapes or chain-shapes of oblique lines are remarkable.

Figure 11A:
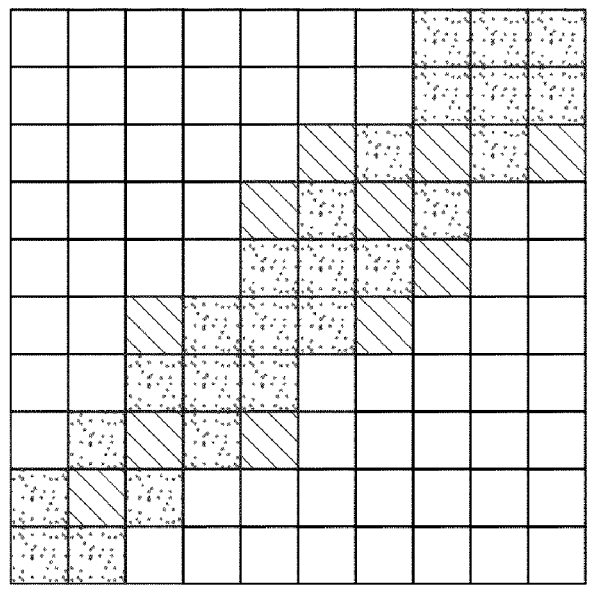
FIGS. 11A and 11B are diagrams for explaining a final image obtained for the embodiment.
Figure 11B:
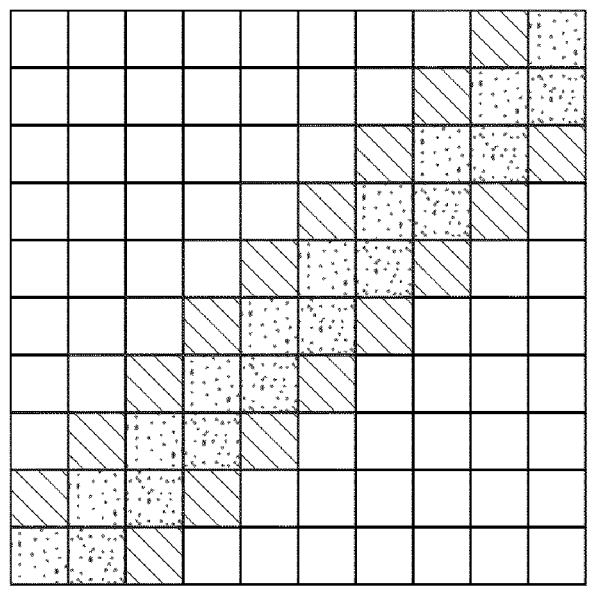

FIG. 11A is a diagram showing the expanded state obtained, by the vertical and horizontal interpolation unit 12 of this embodiment, merely through non-linear interpolation. Due to the use of non-linear interpolation, the step-shapes or chain-shapes of oblique lines are reduced; however, changes in luminance, the cause of uneven coloration, occur in a few places. FIG. 11B is a diagram showing the final image of the oblique line that is output in this embodiment, while taking into consideration the result obtained by the oblique interpolation unit 15. As is described above, according to the embodiment, the number of step-shapes or chain-shapes of oblique lines, which occur during the expansion of an oblique image, is reduced, and an expanded image can be obtained wherein uneven coloration is less remarkable.

Figure 12A:
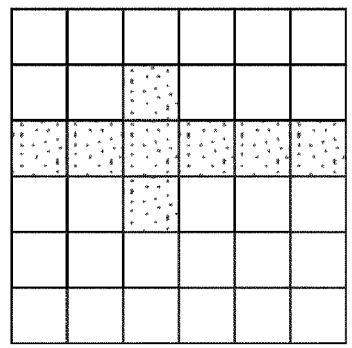
FIGS. 12A and 12B are diagrams for explaining a crossed portion before expansion and a final image obtained using the conventional expansion method.
Figure 12B:
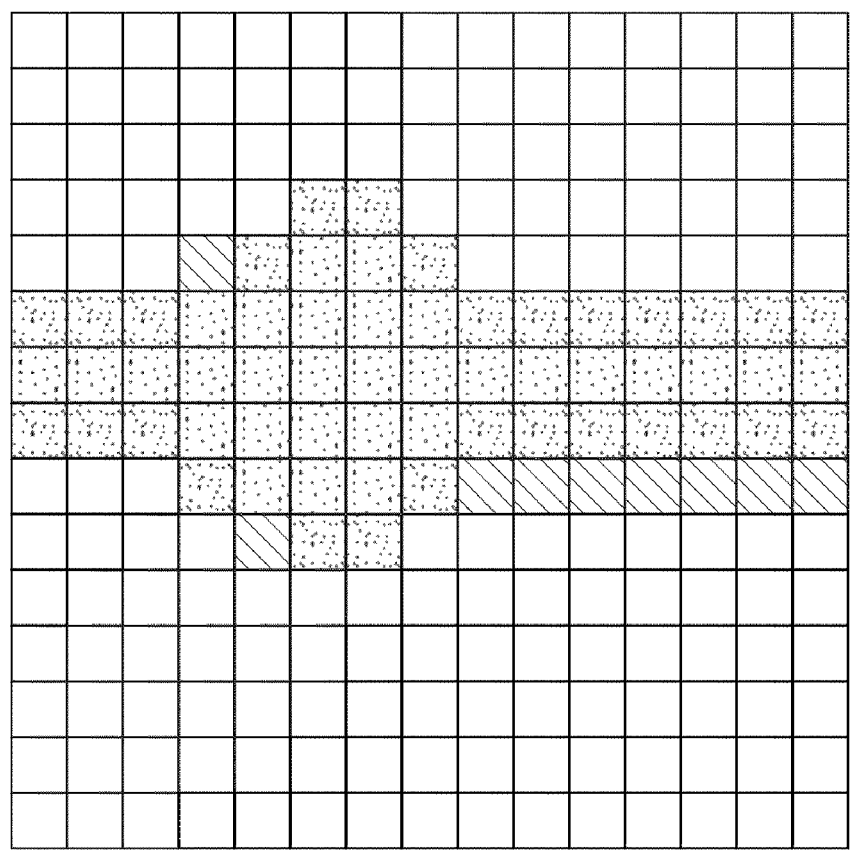
Figure 13:
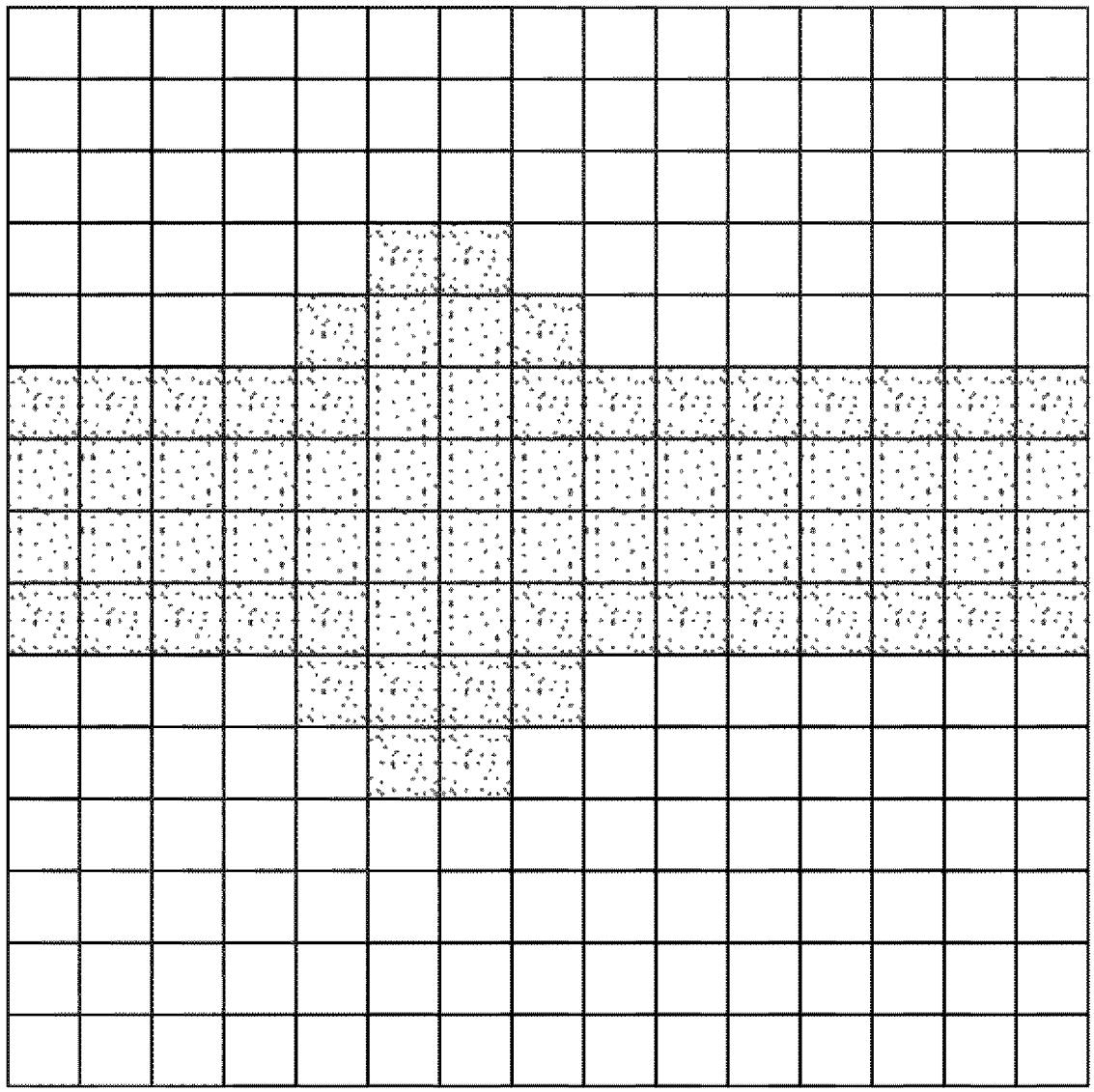
FIG. 13 is a diagram for explaining a final image obtained for the embodiment.

FIG. 12A is a diagram before expansion of an example pattern in which there is a crossed portion. While FIG. 12B is a diagram showing the pattern of a final image provided by the oblique interpolation unit 15 of this embodiment. Since the oblique interpolation unit 15 determines that the crossed portion is continued obliquely, as is shown in FIG. 12B, a phenomenon occurs whereby a round dot having a bulging shape is located at the crossed portion. In this embodiment, since as is shown in FIG. 13 both the vertical and horizontal interpolation unit 12 and the oblique interpolation unit 15 are employed to generate a final result, the above problem can also be resolved.

Figure 14A:
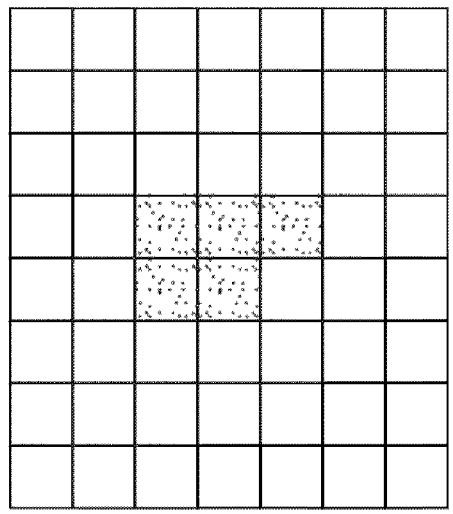
FIGS. 14A and 14B are diagrams showing the state wherein an isolated point is expanded.
Figure 14B:
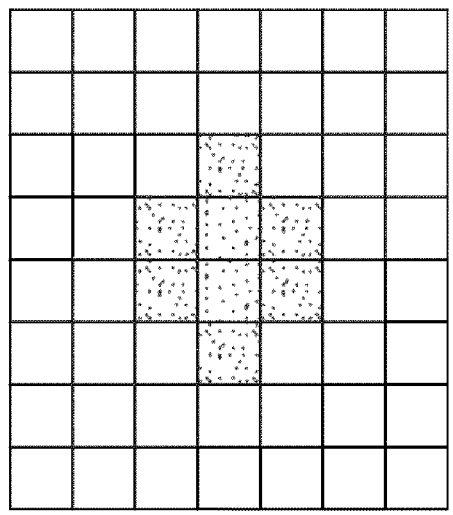

FIGS. 14A and 14B are diagrams showing the state wherein an isolated point is expanded. If an isolated point, represented in the original image by a single pixel, is expanded in the oblique direction by employing the method using pixels arranged in the direction, the point is faded out, as is shown in FIG. 14A. However, since in the embodiment non-linear interpolation in the vertical and horizontal directions is taken into account, an expanded image can be obtained without undue fading of the isolated point occurring.

As is described above, according to this method, it is possible to obtain a final, clear image wherein the number of step-shapes or chain-shapes of oblique lines is reduced and uneven coloration in the same color area is not remarkable, and the balance of the lines composing a character or graphics in an original image is not distorted.

As is described above in detail, according to the embodiment, the vertical and horizontal interpolation unit 12 is employed, so that the original input image data are linearly expanded in the vertical and horizontal directions, or vice versa, and non-linear interpolation is performed for an expanded image having the vertical and horizontal directional correlations to obtain a set of pixels having no directional correlation. Thus, a non-linear expanded image can be obtained wherein step-shapes or chain-shapes of oblique lines are reduced, without distorting the balance of the line structure of characters or graphics in an original image, or losing an isolated point.

Furthermore, the oblique interpolation unit 15 is employed, so that the target pixel value in the original image data and the neighboring pixel values of the target pixel are used to detect connection relationships with the target pixel. Then, based on the obtained results, pixel selection is performed and the direction in which pixels are arranged is determined to perform linear interpolation. Following this, the expansion process is performed through linear interpolation using peripheral pixels arranged in oblique directions. Because of this pixel selection method, the occurrence of step-shapes or chain-shapes of oblique lines can be reduced.

Furthermore, the final result generator 18 generates an image, using a predetermined adjustment value α, based on the first image obtained by the vertical and horizontal interpolation unit 12 and the second image obtained by the oblique interpolation unit 15. Thus, a resolution can be provided for a preferable transformed image that includes the advantages provided for the first and second images.

As is described above, according to the present invention, the occurrence of step-shapes or chain-shapes of oblique lines is reduced, and the distortion or the absence of lines constituting a font or graphics is also reduced, so that a clear, expanded image can be output.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. An image transform method, for transforming original input image data into image data expanded by a ratio represented by a rational number or an integer, comprising the steps of:
    forming an image by linearly expanding original image data in the vertical and horizontal directions; and
    reducing the vertical and horizontal directional correlation of said image through a rank order processing to generate a final expanded image, wherein the rank order processing includes:
    raster-scanning a window enclosing a target pixel and one or more of its neighboring pixels; and
    computing an output value of the target pixel by performing an averaging operation on pixels enclosed within the window;
    determining, for said expanded image, whether the contrast of said original image data can be maintained at a predetermined level; and
    extracting a high frequency component from said expanded image, when said contrast can not be maintained at said predetermined level, and adding said frequency component multiplied by a constant to said expanded image, or subtracting said frequency component multiplied by a constant from said expanded image.

2. A program storage device readable by machine, tangibly embodying a program of instructions executable by the machine to perform method steps for image transformation, said method steps comprising the steps of claim 1.

3. The method of claim 1, further comprising inputting, as an adjustment value, a personal preference of a user concerning image quality.

4. An image processing apparatus for transforming original input image data into expanded image data comprising:
    a vertical and horizontal directional linear interpolation unit for forming an image by linearly expanding original image data in the vertical and horizontal directions; and a vertical and horizontal directional correlation reduction processing unit for reducing, for said image, a vertical and horizontal directional correlation using a rank order processing to generate a final expanded image, operating in combination for transforming the original input image data into expanded image data, wherein the rank order processing includes:

raster-scanning a window enclosing a target pixel and one or more of its neighboring pixels; and computing an output value of the target pixel by performing an averaging operation on pixels enclosed within the window;

a determining unit, for said expanded image, whether the contrast of said original image data can be maintained at a predetermined level; and an extracting unit for extracting a high frequency component from said expanded image, when said contrast can not be maintained at said predetermined level, and adding said frequency component multiplied by a constant to said expanded image, or subtracting said frequency component multiplied by a constant from said expanded image.

5. The apparatus of claim 4, further comprising input unit for entering, as an adjustment value, a personal preference of a user concerning image quality.

6. A computer program product for transforming original input image data into image data expanded by a ratio represented by a rational number or an integer, the computer program product comprising a non-transitory computer-readable medium embodying computer program code, the computer program code comprising computer executable instructions configured for:

forming an image by linearly expanding original image data in the vertical and horizontal directions; and reducing the vertical and horizontal directional correlation of said image through a rank order processing to generate a final expanded image, wherein the rank order processing includes:

raster-scanning a window enclosing a target pixel and one or more of its neighboring pixels; and computing an output value of the target pixel by performing an averaging operation on pixels enclosed within the window;

determining, for said expanded image, whether the contrast of said original image data can be maintained at a predetermined level; and extracting a high frequency component from said expanded image, when said contrast can not be maintained at said predetermined level, and adding said frequency component multiplied by a constant to said expanded image, or subtracting said frequency component multiplied by a constant from said expanded image.

7. The computer program product of claim 6, further comprising executable instructions configured for entering, as an adjustment value, a personal preference of a user concerning image quality.

* * * * *